(12) United States Patent
Hsu et al.

(10) Patent No.: US 6,452,631 B1
(45) Date of Patent: Sep. 17, 2002

(54) METHOD AND APPARATUS FOR FORMING HIGH CONTRAST IMAGE IN IMAGING SYSTEM

(75) Inventors: Chuan-Yu Hsu, Hsinchu; Wen-Tso Tseng, Taichung; Shih-Huang Chen, Miao Li Hsien, all of (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 08/962,989

(22) Filed: Oct. 31, 1997

(51) Int. Cl.[7] ............................ H04N 5/202; G06K 9/40
(52) U.S. Cl. ........................................ 348/254; 382/254
(58) Field of Search .................... 348/254; 382/254, 382/270, 274, 275

(56) References Cited

U.S. PATENT DOCUMENTS

| | | | |
|---|---|---|---|
| 5,696,848 A | * 12/1997 | Patti et al. | 382/254 |
| 5,756,990 A | * 5/1998 | Watkins et al. | 250/252.1 |
| 5,867,604 A | * 2/1999 | Ben-Levy et al. | 382/254 |
| 6,229,649 B1 | * 5/2001 | Woods et al. | 382/254 |

* cited by examiner

Primary Examiner—Wendy R. Garber
Assistant Examiner—Luong Nguyen

(74) Attorney, Agent, or Firm—Pennie & Edmonds LLP

(57) ABSTRACT

The present invention improves the contrast of the image signal before further adjustment by the principle of superposition of the optical-transferring system. There are two ways to carry out the principle of superposition one is in space domain, the other is in frequency domain. Each of them can be implemented by the system or method of the present invention. To implement the compensation in space domain, the present invention utilize the result of scanning the correction board to compensate the optical energy scattered by the optical-transferring system. A pixel in object space can be expressed in terms of the linear combination of the corresponding pixels in image space according to the principle of superposition. Thus is obtained by extracting the coefficients of the linear combination. The pixels of desired picture in image space is multiplied by the compensation vector and the image with sharp contrast is produced by the present invention in space domain. To implement the compensation in frequency domain, the present invention get the result of scanning the correction board and transform it to frequency form. Thus the compensation vector is obtained by extracting the amplitude and phase angle of the frequency form of the result of scanning the correction board. Transform the result of scanning the desired picture into frequency form, followed by dividing it by the compensation vector. The desired picture in frequency form is obtained. Taking the inverse transform of the desired picture, which is in frequency form, the result is transformed in space domain and can be processed or displayed with sharp contrast.

29 Claims, 12 Drawing Sheets

METHOD AND APPARATUS FOR FORMING HIGH CONTRAST IMAGE IN IMAGING SYSTEM

BACKGROUND OF THE INVENTION

1. Field of the Invention

The present invention relates to an imaging system, and more particularly to a method for image scanning device in an imaging system.

2. Description of the Prior Art

An imaging system makes use of focusing a reflected light beam through a photodetector to generate an image signal for further image processing, storing and displaying. Among various applications such as image scanners, camera recorders or facsimile machines everywhere in the modern world, there are two primary functions performed in these machines, i.e., image signal capturing and analogue-to-digital converting.

For example, the block diagram of an image scanner in the prior art is shown in FIG. 1. This system operates in the way that the light emitted by light source 10 and reflected by the document surface 11 and mirror 12 pass through lens 13 and focused by lens 13. Been focused by lens 13, the light is consequently converted to a digital signal by the analog to digital converter 15.

Thus the optical image signal is transformed into electrical image signal by CCD 14. Then the analog to digital converter (ADC) 15 convert the analog image signal to an digital image signal and then feed it to the digital calibration 16. The image acquired by scanning correction board 18 is used to generate the compensation factor that fed to digital calibration 16. Digital calibration 16 is used to provide a reference level to the digital image signal. Also, digital calibration 16 correct the defect, such as dust on the surface of optical elements, of the optical system. The output signal of the digital calibration 16 is fed to the digital signal processing (DSP) module 17 to proceed the other processes. The output signal of the digital signal processing (DSP) module 17 can be further processed, stored and displayed.

Referring to FIG. 2, the optical system is indeed an optical-energy transferring system. The system is able to transfer the optical-energy distribution of source object 212 to the optical-energy distribution of transferred image 214 through lens 213. Owing to the defects of the optical-transferring system and the diffraction of the light, the optical-energy distribution of source object 212 is distorted when source object 212 is transferred by lens 213 to transferred image 214.

In the microscopic aspect, the energy of a pixel of source object 212 is mainly transferred to a corresponding pixel and neighboring pixels, it is why the quality of an output image of the system in the prior art is degraded. Referring back to FIG. 1, thus the optical-energy distribution of the object behind document surface 11 is not the same with that of CCD 14, and the quality of the output image is degraded. Because the source signal is distorted before CCD 14, no matter what efforts the system makes, the output image is the same as the signal received by CCD 14 at best. This is also the reason why the quality of an output image of the system in the prior art can not be upgraded to a large extent.

In traditional technology, it is necessary to upgrade the specification of the optical elements in an imaging system, if the request of optical signal is critical. Whereas the optical elements with better performance always cost much, it does not meet the application of an imaging system.

SUMMARY OF THE INVENTION

The present invention relates to an imaging system, and more particularly to a method for image scanning device in an imaging system. Improving the quality of the image that produced by an imaging system, a method for enhancing modulation transfer function of an imaging system is utilized in the present invention to improve the contrast of the output image.

The first preferred embodiment of the present invention improves the contrast of image in space domain, which providing the following devices including pre-processing device, digital calibration device, modulation transfer function (MTF) enhancing device and post-processing device.

Pre-processing device for generating a digital image signal by scanning an object containing abrupt change in gray level. The pre-processing device containing a photoelectric device and an optical-transfer system, the object comprises a correction board having a surface with abrupt change in gray level. The photoelectric device is a charge-coupled device (CCD).

The pre-processing device containing an image acquiring device for acquiring an optical image as the source of the optical-transfer system a photoelectric device for converting an optical image to an electric signal and a sampling device for converting the electric signal to the digital image signal. The sampling device is an analog-to-digital converter. Digital calibration device for generating a reference level by scanning the correction board.

Modulation transfer function (MTF) enhancing device for generating a modified digital image signal by processing the digital image signal and the basic modifying vector. The modulation transfer function enhancing device is used to obtain a backward modifying vector by the product of a rearranged basic modifying vector and the digital image signal, wherein the rearranged basic modifying vector in reformed from the basic modifying vector. The other purpose of the modulation transfer function enhancing device is to generate the modified digital image signal by multiplying the digital image signal and the backward modifying vector. Post-processing device for generating image codes by processing the digital image signal.

The second preferred embodiment of the present invention improves the contrast in frequency domain, which providing the following devices including Pre-processing device, digital calibration device, Fourier transform device modulation transfer function (MTF) enhancing device and post-processing device.

The pre-processing device is the same as that mentioned in the first preferred embodiment. The output of the pre-processing device contains two parts, one is the result of scanning correction board, and the other is that of object.

The Fourier transform device is to convert the space domain signal to a frequency signal, so as to generate a basic modifying vector by extracting the amplitude and phase angle of the result of scanning the correction board. The Fourier transform device also generate a transformed digital image signal by extracting the amplitude and phase angle of the result of scanning the object, which the basic modifying vector contains a plurality of amplitude of various frequencies and a compensation angle, the transformed digital image signal contains amplitude of various frequencies.

Modulation transfer function (MTF) enhancing device is to generate a modified digital image signal by processing the basic modifying vector and the transformed digital image signal, which the transformed digital image signal is divided by the amplitude of the basic modifying vector and the phase angle of the transformed digital image signal is subtracted by the compensation angle.

The inverse Fourier transform is used to convert a frequency domain signal to a space domain signal that is the signal with degrade factor compensated.

The inverse Fourier transform device is to generate an inverse transformed digital image signal by processing the modified digital image signal, which the inverse Fourier transform device multiply the modified digital image signal by sine signals of various frequencies.

Post-processing device is to generate an image code by processing the inverse transformed digital image signal.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1:
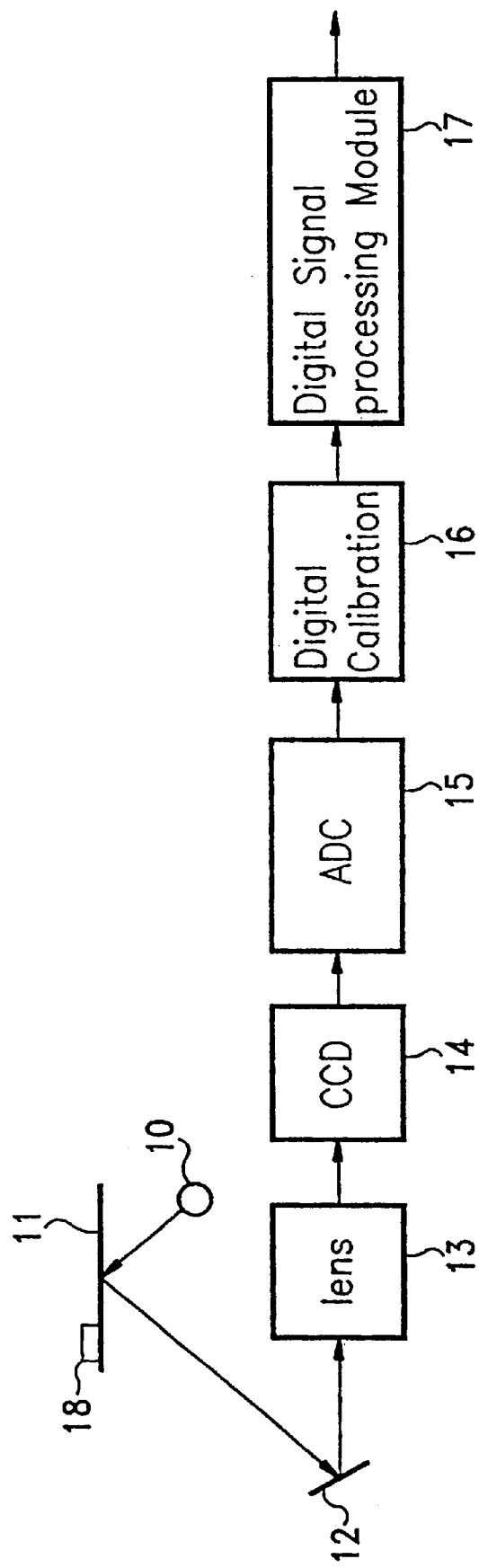
FIG. 1 is the block diagram of a scanner in the prior art.
Figure 2:
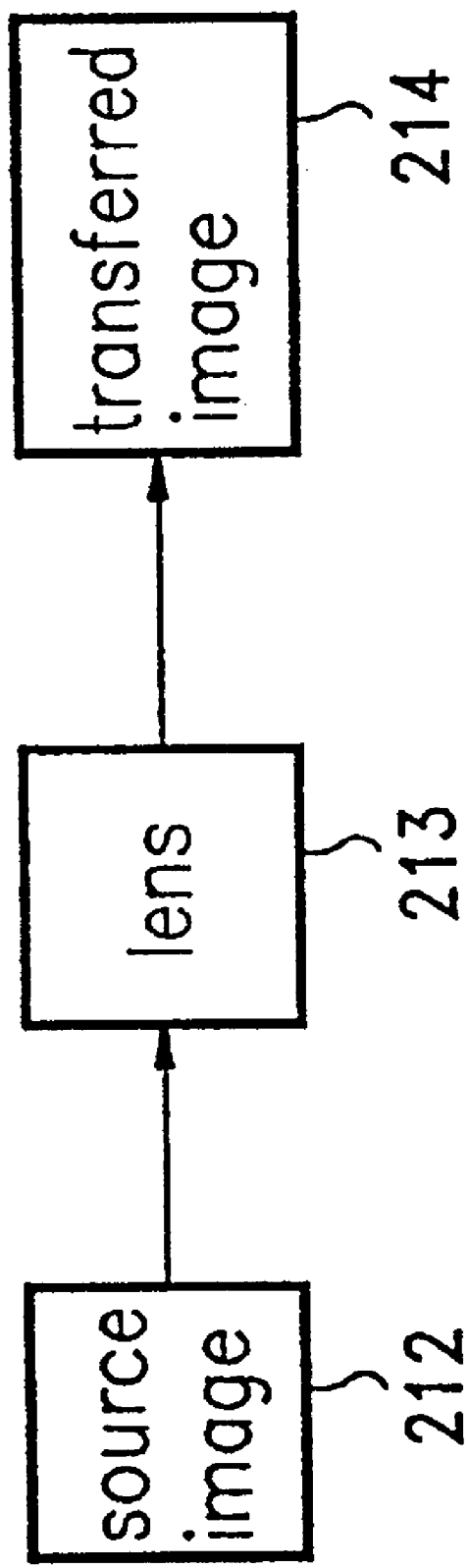
FIG. 2 is the block diagram of an optical-transferring system.

The present invention utilize the modulation transfer function (MTF) enhance module to compensate the degraded image of source object after it is transferred. The present invention can be implemented by two ways, one is in space domain, and the other is in frequency domain. The first preferred embodiment is to implement the compensation in space domain and the second preferred embodiment is to implement the compensation in frequency domain.

The first preferred embodiment is to compensate the contrast of an image in space domain. In space domain, the energy distribution of an image is acquired by transferring the light reflected by an object, and the optical-energy of an object point is spread to a corresponding pixel and the neighboring pixels in image space. Assume that the energy of a pixel in object space is 1, and the optical-energy of a pixel is spread to 5 pixels (more or less pixels can work too) in image space. The energy of the 5 pixels in image space is assumed to be $\alpha_{-2}, \alpha_{-1}, \alpha_0, \alpha_1$ and $\alpha_2$ respectively, and most optical-energy of the pixel in object space is contained in $\alpha_0$. The geometric relationship of the pixel in object space and the corresponding 5 pixels in imagine space is that the pixel in object space direct in front of $\alpha_0$, and $\alpha_{-1}, \alpha_1$ adjoining as on both sides of $\alpha_0$. Whereas $\alpha_{-2}$ and $\alpha_2$ adjoin to $\alpha_{-1}$ and $\alpha_1$ respectively. The more pixels in image space are taken into consider, the more precision the pixel in object space is approached.

Furthermore, assume that the optical-energy of some neighboring pixels in object space are $a_1, a_2, a_3 \ldots a_9$, and the optical-energy of relative pixels in image space are $b_1, b_2, b_3 \ldots b_9$. Generally speaking, the optical-transferring system can be considered as a linear system, the principle of superposition can be utilized, so the optical-energy of the pixels in the image space could be expressed as a linear combination of the optical-energy of the corresponding pixels in the object space.

According to the theory above mentioned, the optical-energy $b_i$ of the i'th pixels in the image space can be expressed as the linear combination of $a_{i-2}, a_{i-1}, a_i, a_{i+1}$ and $a_{i+2}$ with coefficients $\alpha_{-2}, \alpha_{-1}, \alpha_0, \alpha_1$ and $\alpha_2$ respectively, where $3 \leq i \leq 7$. It is obviously that the optical-energy of a pixel in the image space can be represented by the output voltage of the charge-coupled device (CCD), so $b_i$ is known. Because every equation of linear combination contains 5 parameters, 5 equations are thus used to express the optical-energy of the pixel $a_i$ in the object space. Finally the optical-energy of the pixels $a_i$ in the object space can be expressed as: (take $a_5$ for example)

$$a_5 = S/A + R/A \tag{1}$$

where $$A = [1 - 2(\alpha_{-2} \times \alpha_2)/\alpha_0^2 - 2(\alpha_{-2} \times \alpha_2)/\alpha_0^2] \tag{2}$$

$$S = [b_5 - (\alpha_{-2}/\alpha_0)b_3 - (\alpha_{-1}/\alpha_0)b_4 - (\alpha_1/\alpha_0)b_6 - (\alpha_2/\alpha_0)b_7]/\alpha_0 \tag{3}$$

$$R = \{[(\alpha_{-1}^2/\alpha_0)a_3 + (2\alpha_1\alpha_{-2}/\alpha_0)a_4 + (2\alpha_{-1}\alpha_2/\alpha_0)a_6 + (\alpha_{-1}^2/\alpha_0)$$

$$a_7] + [(\alpha_{-2}^2/\alpha_0)a_1 + (2\alpha_{-1}\alpha_2/\alpha_0)$$

$$a_2 + (2\alpha_1\alpha_2/\alpha_0)a_8 + (\alpha_{-2}^2/\alpha_0)a_9]\}/\alpha_0 \tag{4}$$

If the value of $a_5$ is taken as S/A, the error is R/A. Usually an optical-transferring system can be treated as a symmetrical system approximately, so it is reasonable to assume that $\alpha_1 = \alpha_{-1}, \alpha_2 = \alpha_{-2}$ and $\alpha_0 > \alpha_{-1} > \alpha_2$. Observing the expression of R, the error can be reduced by substituting the linear combinations of $a_3, a_4, a_6$ and $a_7$ to instead the parameter $a_3, a_4, a_6$ and $a_7$. Thus the optical-energy of the pixels in the image space will be more approaching the optical-energy of the pixels in the object space by more times of iteration. The more times the iteration mentioned above proceed, the more precise $a_5$ is. Another way to increase the precision of $a_5$ is to take more than 5 points utilized in the above-mentioned example.

Observing equations (1), (2), (3) and (4), the optical-energy of a pixel in the object space can be expressed by another parameter $\beta_i$ expressed in equation (5) shown below, which means that $\beta_i$ is the function of $\alpha_{-2}, \alpha_{-1}, \alpha_0, \alpha_1$ and $\alpha_2$.

$$\beta_i = f(\alpha_{-2}, \alpha_{-1}, \alpha_0, \alpha_1, \alpha_2) \tag{5}$$

According to equation (5), the pixel $a_5$ in the in object space can be approximated by equation (6) described below:

$$a_5 = \beta_0 b_5 + \beta_{-2} b_3 + \beta_{-1} b_4 + \beta_1 b_6 + \beta_2 b_7 \tag{6}$$

Because the modified optical-energy of the pixels $a_i$ in the object space can be acquired by multiplying $\beta_i$ by the optical-energy of the pixels in the image space, $[\beta_i]$ is defined as compensation vector whereas every component of

[β$_i$] is defined as compensation factor. It is obvious that when the compensation vector and the optical-energy of the pixels in the image space are acquired, the optical-energy of the pixels in the object space can be obtained.

Figure 3:
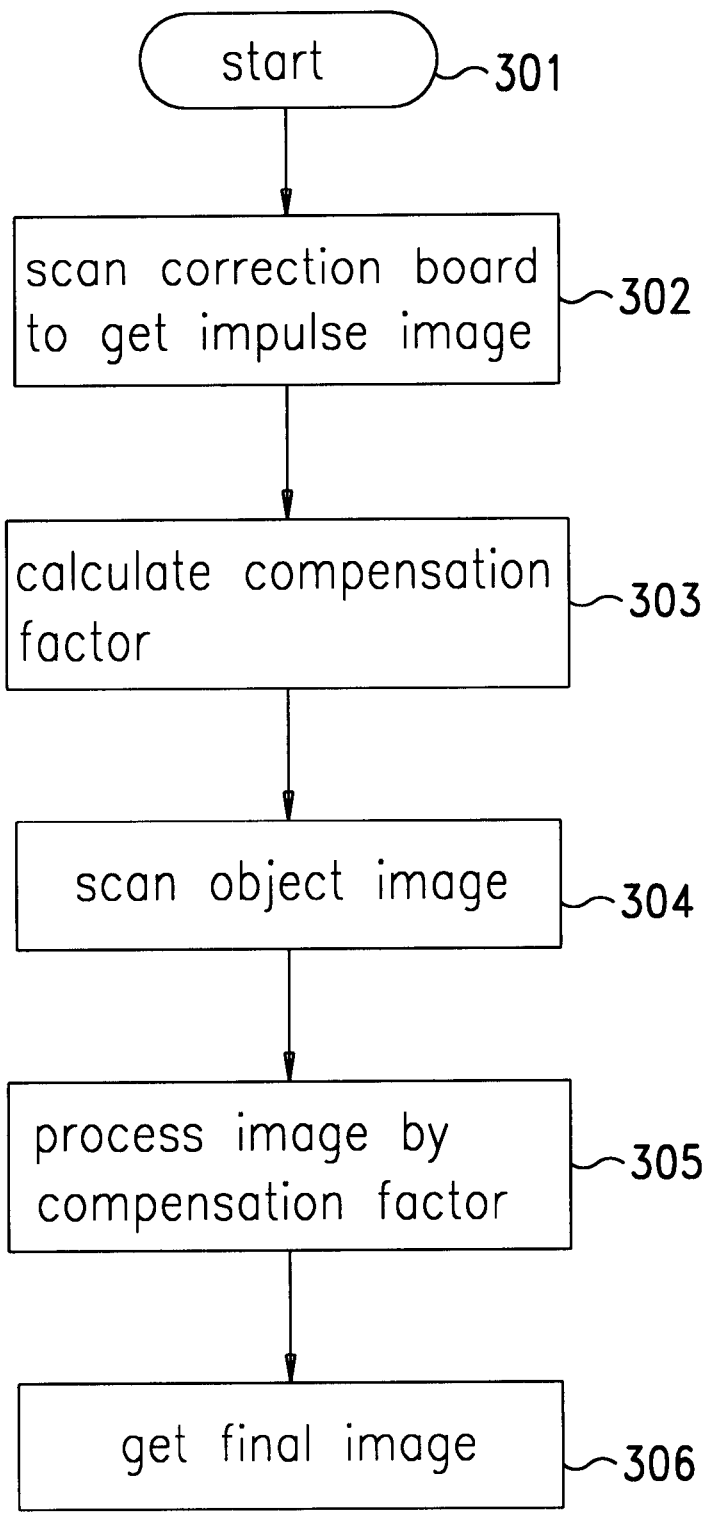
FIG. 3 is the flow chart of the method in the present invention of the first preferred embodiment.

The previously mentioned sections described how the image with better contrast are acquired. The method utilized in the first preferred embodiment of the present invention is shown in FIG. 3, and the flow chart details how the system of the first preferred embodiment of the present invention get the modified picture with sharper contrast. In FIG. 3, the system starts at step 301 and followed by step 302 "scan correction board to get impulse image" to scan a correction board 400 shown in FIG. 4. Because the color of the surface of correction board is in sharp contrast, the gray level of neighboring pixels is abrupt changed, it is like a step function. An impulse function is generated by differentiating the step function. The impulse can be treated as a pixel in the object plane.

Figure 4:
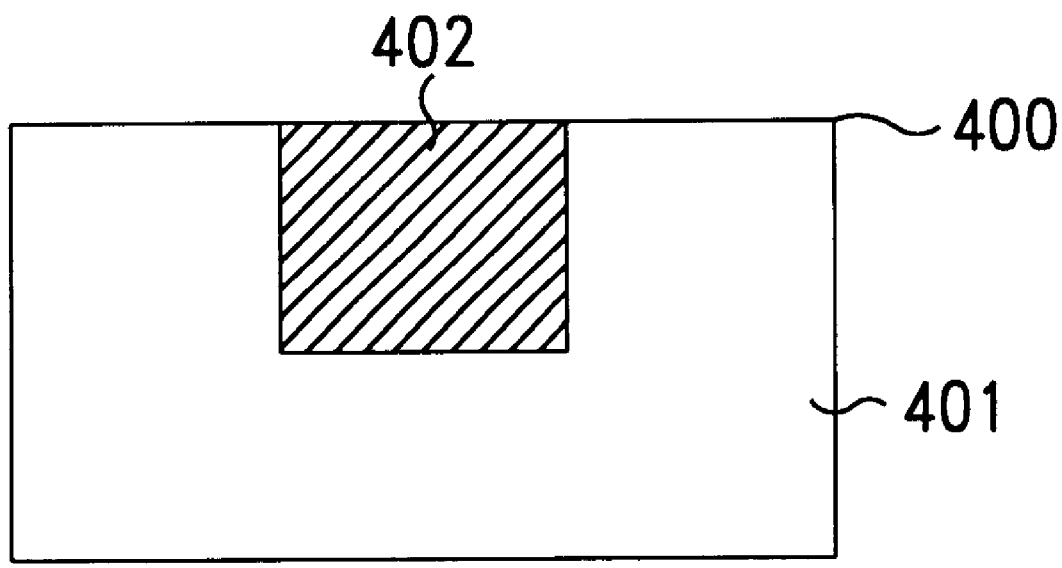
FIG. 4 is the possible outlook of a correction board.

As shown in FIG. 4, the correction board 400 is composed of portion 401 and portion 402, wherein, the former two are white and the latter one is black. Because the difference of gray level of the neighboring blocks is the largest (255 in this example), the step function image can be acquired.

In the first preferred embodiment, the distribution coefficients are obtained by differentiating the step function image wherein the differentiating is carried out by subtracting the neighboring pixels of the impulse image on the image space. After the distribution coefficients $\alpha_{-2}$, $\alpha_{-1}$, $\alpha_0$, $\alpha_1$ and $\alpha_2$ are obtained, the compensation factors are acquired by step 303 which is according to these equations (1), (2), (3), (4) and (6).

Step 304—"scan object image" is to get the electrical image of an object (such as a picture), thus the optical-energy of every pixel in image space is known. Step 305—"process image by compensation factor" utilize both the image obtained in step 304 and the compensation factors calculated in step 303 to get the modified image which have the optical-energy distribution more approaching the optical-power distribution in object space. In step 305, the gray level of each neighboring 5 pixels obtained in step 304 is multiplied by the compensation factors calculated in step 303, thus the gray Level of a pixel is more approaching that of the pixels in object space. Since every pixel of the image of an object can be processed by step 305 to generate a modified pixel. After all the pixels are modified, step 306—"get the final image" construct the picture with sharper contrast.

FIG. 4 shows the outlook of a correction board 400 containing black portion 402 and white portions 401. The color of white portions 401 is white and the color of black portion 402 is black. Because the purpose of a correction board is to provide a picture of sharp contrast, the outlook of a correction board is not confined to the figure of FIG. 4. Any type of correction board of sharp contrast is in the scope of the present invention.

Figure 5:
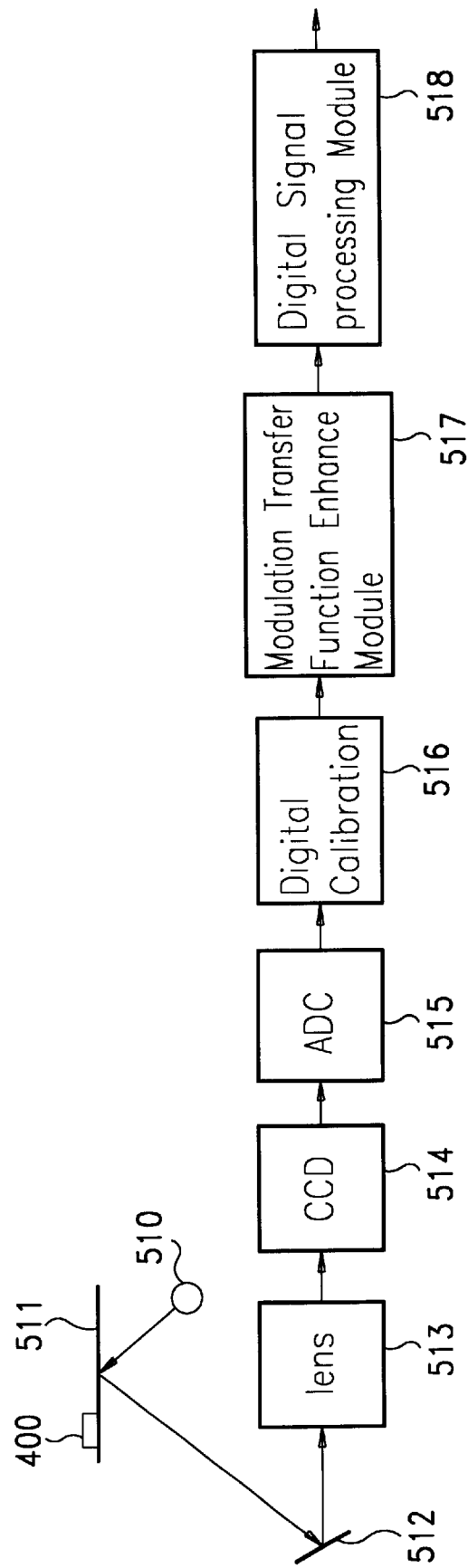
FIG. 5 is the block diagram of a scanner in the present invention of the first preferred embodiment.

Refer to FIG. 5, the light source 510 emits the light to scan the correction board 400 stuck to the glass surface 511 and the picture behind the glass surface 511. Reflected by mirror 512, the light pass through lens 513 and is focused on CCD (Charge Coupled Device) 514. Thus an image signal is converted to an electrical signal and ADC (Analog to Digital Converter) 515 convert an analog signal to a digital signal.

After the modified image signal had been processed by digital calibration 516, the modulation transfer function enhance module utilize the resulted signal to generate a final image signal by the method described in step 305. The final image signal is further processed by mapping according to a Gamma function to complete the process of the imaging system. The signal produced by modulation transfer function enhance module 517 is fed to digital signal processing module to perform further image processing such as contrast adjustment mentioned in the prior art. Because the quality of the image before contrast adjustment is better than that of the prior art, the resulted image is better than that of prior art.

Figure 9A:
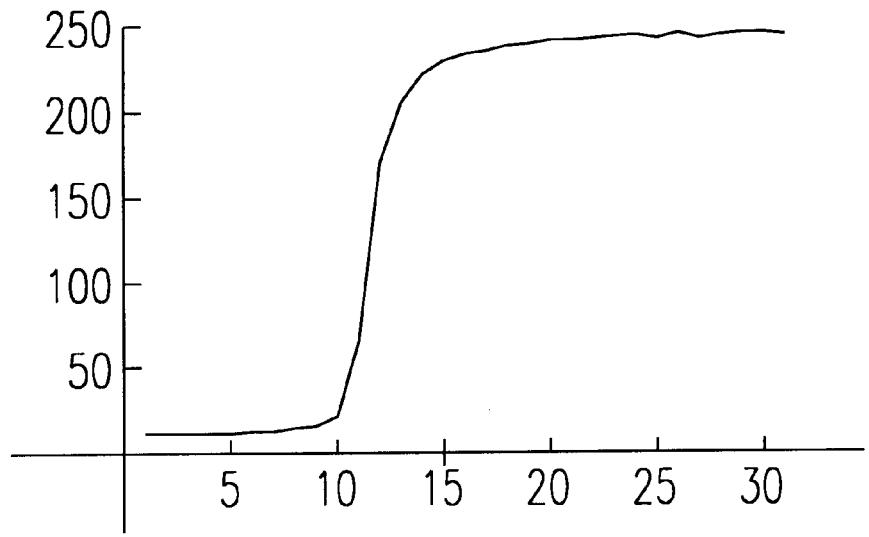
FIG. 9A~FIG. 9D shows the result of the result of the second preferred embodiment, which the vertical coordinate represents gray level and the horizontal coordinate represents the neighboring pixels.
Figure 9B:
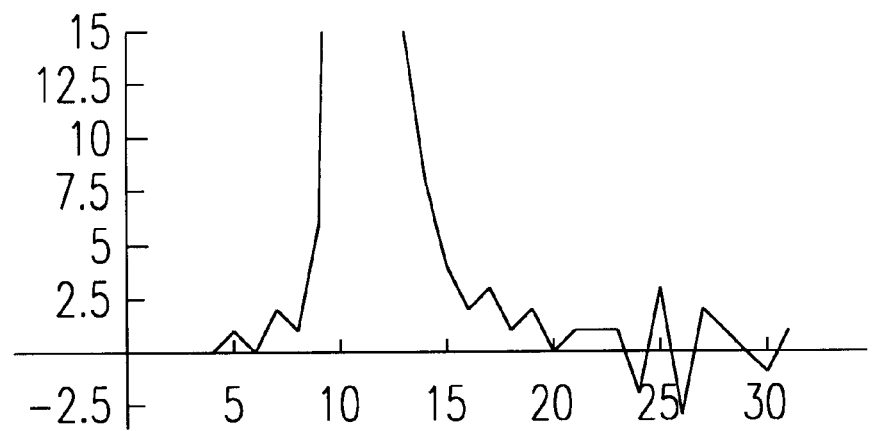
Figure 9C:
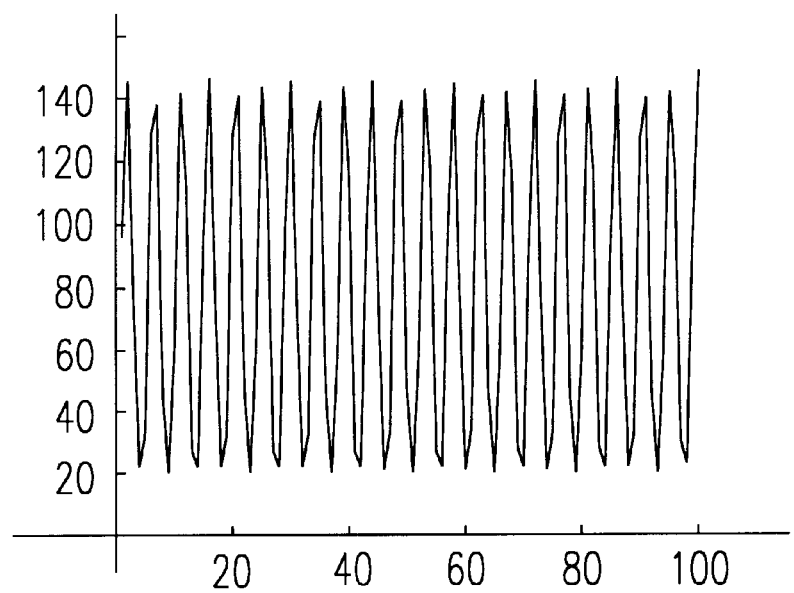

As an example, if the result of scanning impulse image is obtained as [6, 47, 102, 36, 15 . . . ] shown in FIG. 9B. The distribution coefficients are derived and the result is [0.05, 0.2, 0.5, 0.2, 0.05], and the compensation factors are 0.125, −0.667, 2.08, −0.667, and 0.125. The result of simulation is shown in FIG. 6A~FIG. 6B, wherein FIG. 6A shows that the source object is an uniform brightness document of gray level say 100, FIG. 6B shows that the source object is a special black-and-white pattern.

Figure 6A:
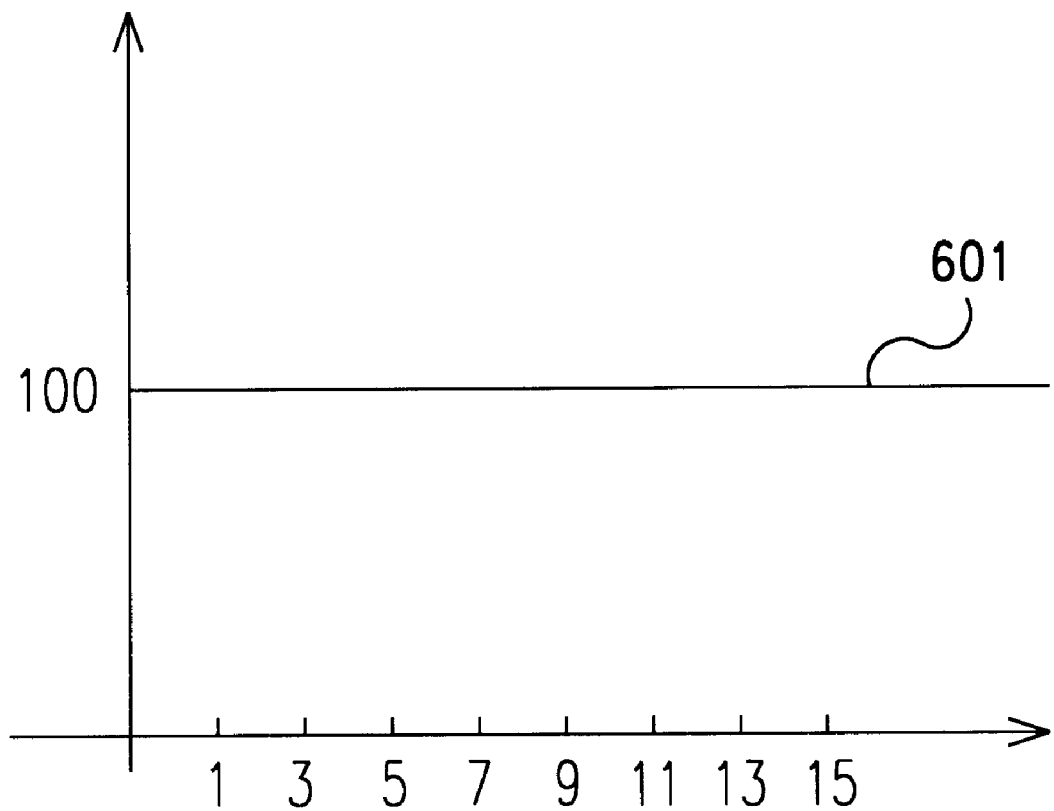
FIG. 6A, FIG. 6B and FIG. 6C shows the result of the result of the first preferred embodiment, which the vertical coordinate represents gray level and the horizontal coordinate represents the neighboring pixels.

In FIG. 6A, the source object, the image after lens (the degraded energy of optical system been corrected) and the result after compensation by the first preferred embodiment in the present invention are overlapped together as line 601 in this example. According to the principle of the first preferred embodiment, the result after lens and the data after compensation is predicted the same as the source data, referring to FIG. 6A, the result proved the prediction.

Figure 6B:
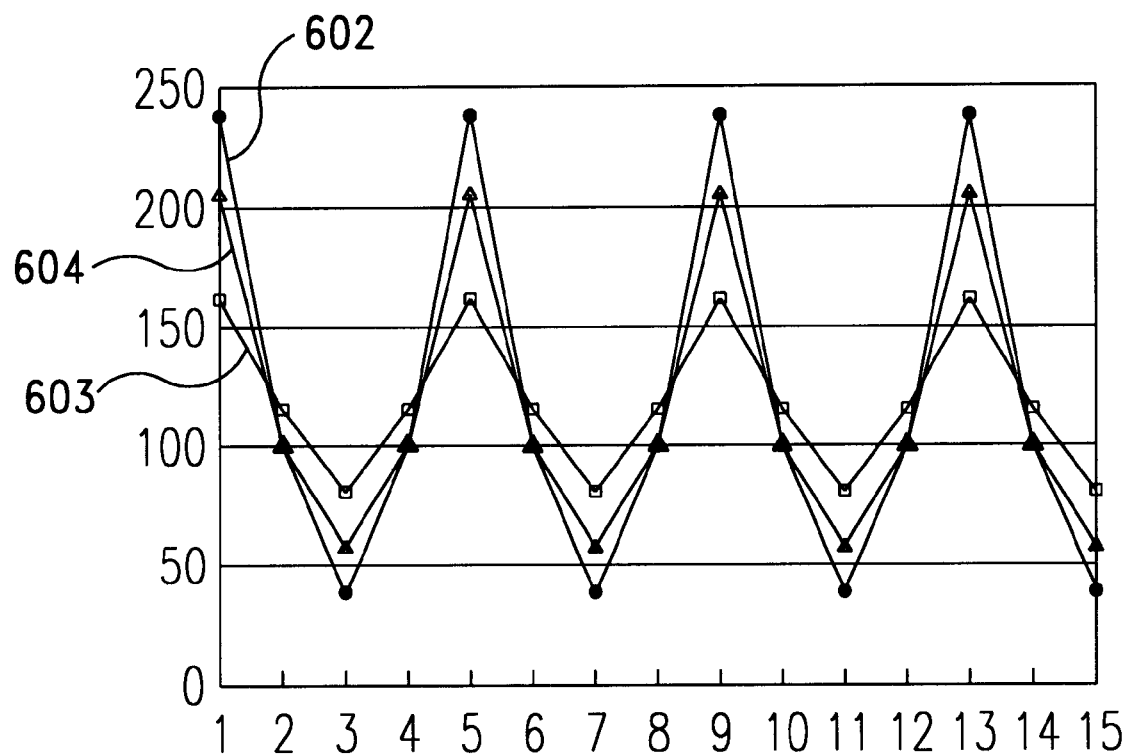
Figure 6C:
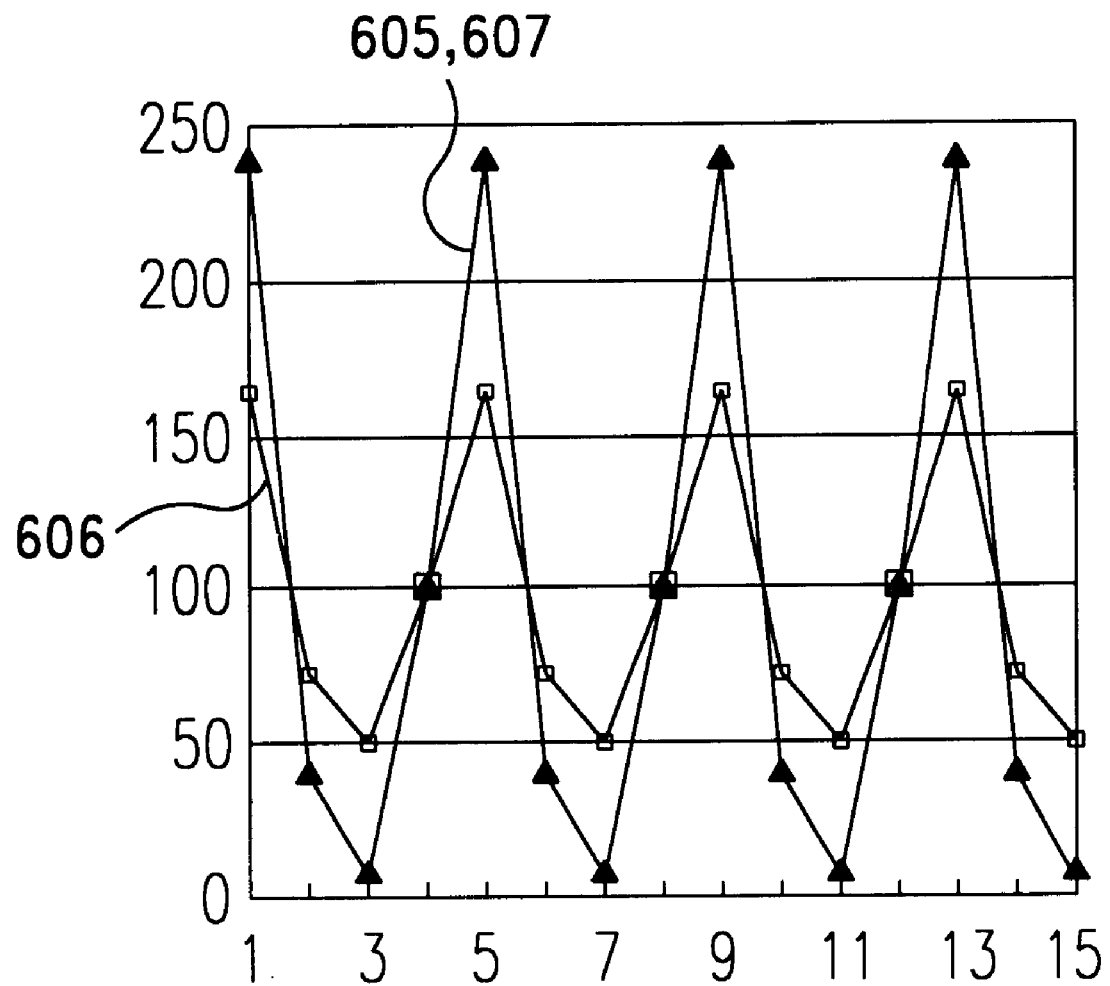

In FIG. 6B, line 602 represents the source object, line 603 represents the image resulted after lens and line 604 represents the result after compensation by the first preferred embodiment in the present invention. According to the principle of the first preferred embodiment, the contrast of the result after lens should be smaller, and the contrast of the result after compensation should be enlarged. FIG. 6B proved the prediction.

In the second preferred embodiment of the present invention, the compensation in frequency domain is utilized to better the contrast of an image. Assume that the optical energy distribution I(y) expressed as the following:

$$I(y)=(1+a\cdot\cos wy) \quad (7)$$

Where $w=2\pi\mu$ and $\mu$ is the spatial frequency in object space.

Been converted by the optical-transferring system, the optical energy distribution I(y) becomes I'(y) which:

$$I'(y)=1+a'\cdot\cos(wy'+\theta') \quad (8)$$

Where $w=2\pi\mu'$ and $\mu'$ is the spatial frequency in image space.

Define MTF (modulation transfer function) is a'/a and PTF (phase transfer function) is θ', which can be expressed by MTF($\mu$) and PTF($\mu$) respectively.

If I(y) is an impulse image, the result of the Fourier transform is 1, it's image in image space can be expressed as 1+a'·cos(wy+θ'), and then a' is the MTF($\mu$) and θ' is the PTF($\mu$) of the optical-transferring system. If the imaging system is designed to better the contrast of the picture in image space, the degrade factors a' and θ' described in above section must be compensated. Assume that a desired object signal is:

$$D(y)=1+\Sigma b_i \cdot \cos w_i y \quad (9)$$

Where $w_i=2\pi\mu_i$ and $\mu$ is the spatial frequency in object space.

Assume that the aforementioned object's image signal is:

$$D'(y)=1+\Sigma b_i'\cdot\cos(w_i'y'+\theta'') \quad (10)$$

Where $w_i'=2\pi\mu_i'$ and $\mu'$ is the spatial frequency in image space.

To eliminate the degradation of optical-transferring system, MTF($\mu$) and PTF($\mu$) are utilized to compensate b' and θ". After the degrade factor had been compensated, the image signal becomes F(y) and the final signal is acquired by inverse Fourier transform, which:

$$F(y)=1+\Sigma(b_i'/MTF(\mu))\cdot\cos\{w_i'y'+[\theta''-PTF(\mu)]\} \quad (11)$$

Where w=$2\pi\mu_i'$ and $\mu$ is the spatial frequency in image space.

Figure 7:
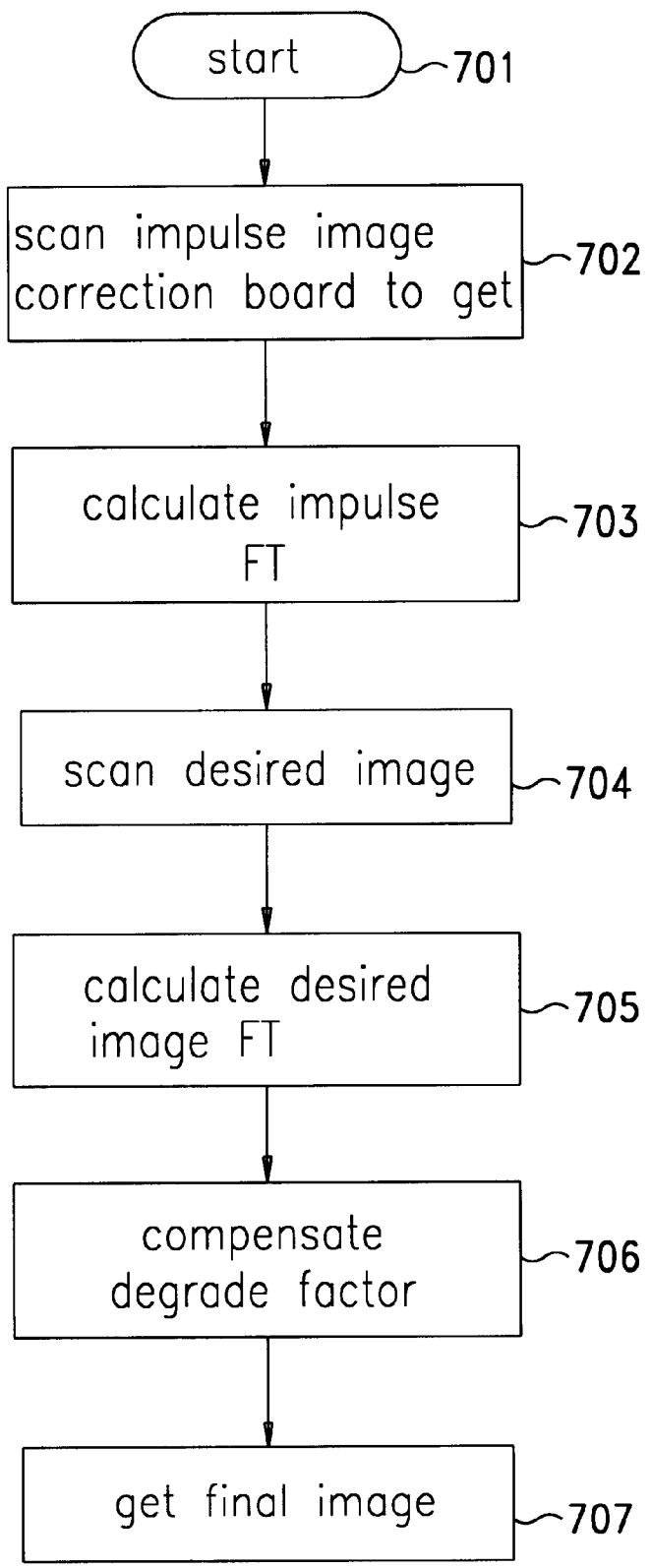
FIG. 7 is the flow chart of the method in the present invention of the second preferred embodiment.

The flow chart of the second preferred embodiment of the present invention is shown in FIG. 7. The flow chart starts at step 701 followed by step 702 "scan correction board to get impulse image", which is the same as that of step 302 in FIG. 3.

To calculate the degrade factor, step 703—"calculate impulse FT", executes the Fourier transform of the impulse image, thus the degrade factors MTF($\mu$) and PTF($\mu$) are obtained. The next step 704—"scan desired image" gets the image signal of the desired picture, the gray level of every pixel are obtained. Step 705—"calculate the desired image FT" carry out the Fourier transform of the image signal of the desired picture.

The following step is to compensate the degrade factor of the desired picture by using equation (11), which is accomplished in step 706—"compensate degrade factor". Finally, the final image is acquired in step 707—"get final image", which is performed by taking inverse Fourier transform of the desired image signal with degrade factor compensated. After processing the image by the inverse Fourier transform, the final image signal is further processed by mapping according to such as a Gamma function to complete the process of the imaging system.

Figure 8:
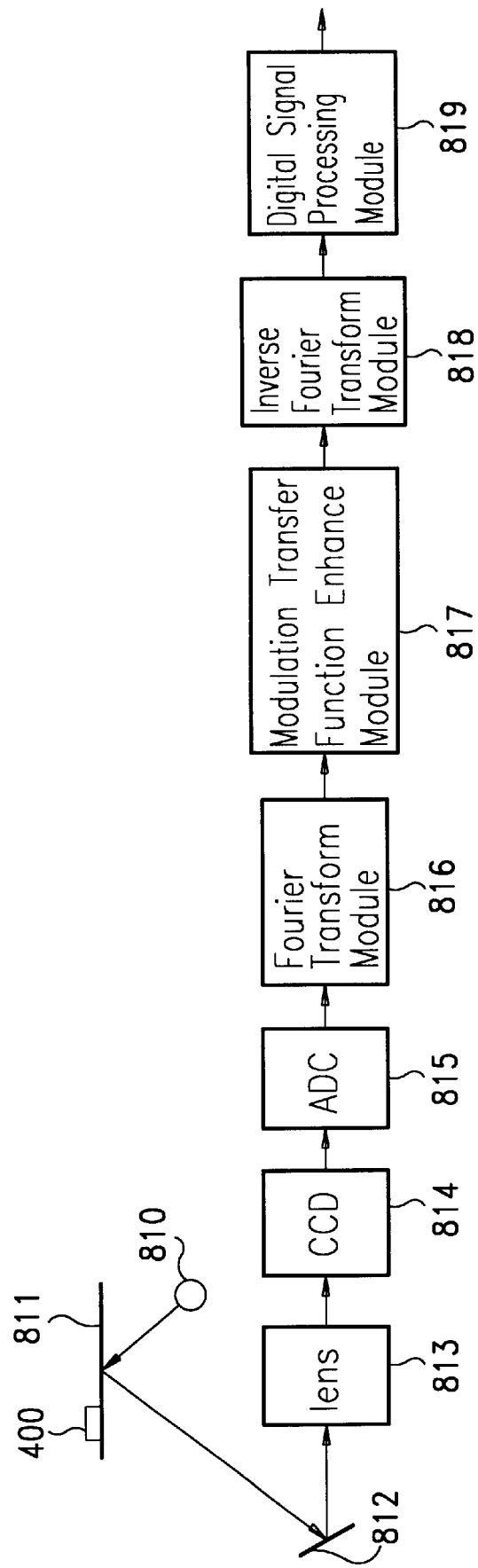
FIG. 8 is the block diagram of a scanner in the present invention of the second preferred embodiment.

FIG. 8 shows the block diagram of the second preferred embodiment of the present invention, Refer to FIG. 8, the light source 810 emits the light to scan the correction board 400 stuck to the glass surface 811 and the picture behind the glass surface 811. Reflected by mirror 812, the light pass through lens 813 and is focused on CCD (Charge Coupled Device) 814. Thus an image signal is converted to an electrical signal and ADC (Analog to Digital Converter) 815 convert an analog signal to a digital signal.

The Fourier transform module 816 convert the digital image signal obtained from scanning correction board 400 and desired picture to get degrade factors MTF($\mu$), PTF($\mu$) and desired image signal D(y). Modulation transfer function enhance module 817 execute the operation as described in equation (11).

After the modified image signal had been processed by modulation transfer function enhance module 817, the inverse Fourier transform module utilize the resulted signal to generate a final image signal by inverse Fourier transform. The signal produced by inverse Fourier transform module 818 is fed to digital signal processing module 819 to perform further image processing in digital signal processing. Because the quality of the image before contrast adjustment is better than that of the prior art, the resulted image is better than that of prior art.

It is obvious that the frequency domain compensation described in the second preferred embodiment can be accomplished by transforms other than Fourier transform. For example, the Fourier transform and inverse Fourier transform utilized in the second preferred embodiment, can be replaced by FFT(Fast Fourier Transform), Laplace transform and other transform in frequency domain. In the second preferred embodiment the Fourier transform can be accomplished in a chip Motorola DSP 56002.

Figure 9D:
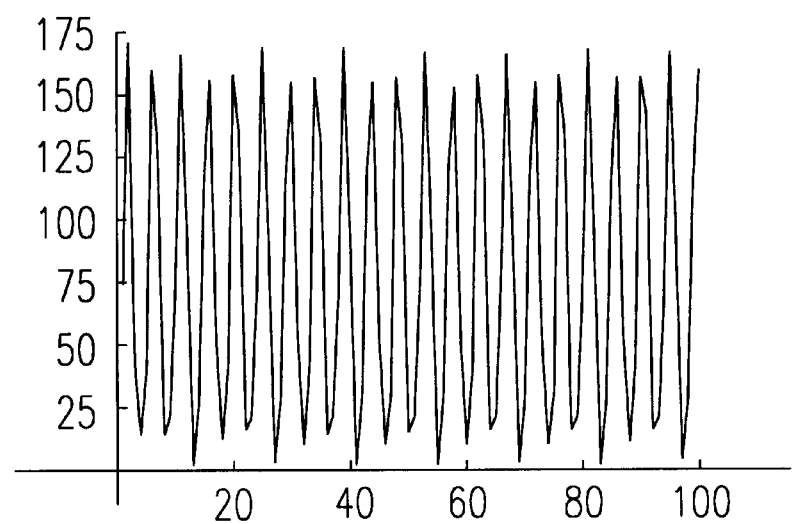

The result of a simulation of the second preferred embodiment is shown in FIG. 9A~FIG. 9D, wherein the vertical coordinate represents gray level and the horizontal coordinate represents the neighboring pixels. Scanning portion 401 and 402 of correction board 400, the output is shown in FIG. 9A. It is clear that there is an abrupt change in gray level of neighboring pixels just like a step function, and the differentiate. A desired image signal is obtained in step 704. Refer to FIG. 9D, which is the result of step 707, the difference of gray level of the neighboring pixels is larger. This is evident that the contrast is made better by the method or device of the second preferred embodiment in the presentation invention.

Although specific embodiments have been illustrated and described, it will be obvious to those skilled in the art that various modification may be made without departing from the spirit, such as the shape and color of the correction board and the method used to transform a signal from space domain to an image domain, which is intended to be limited solely by the appended claims.

What is claimed is:

1. A method for forming an image of an image system with sharp contrast, which comprises:

converting an image in image space to a digital image signal by scanning an object, wherein said object comprises a correction board having a surface with various gray levels on the surface, and the set of pixels on said object is object space, whereas the set of pixels on said image is image space, thus the object space is transferred to image space;

generating a basic modifying vector according to the result of scanning said correction board, wherein said basic modifying vector is obtained according to the ratio of the optical energy of a plurality of neighboring pixels in image space to a corresponding pixel in object space;

obtaining a backward modifying vector by expressing said pixel in object space in terms of a linear combination of portion of said plurality of corresponding pixels in image space, wherein said backward modifying vector is the coefficients of said linear combination; and generating a modified digital image signal by multiplying said digital image signal and said backward modifying vector.

2. The method as claim 1, wherein said correction board comprising a first gray level and a second gray level, which the first gray level is minimum gray level and the second gray level is the maximum gray level in said image system.

3. The method as claim 1, wherein said image is converted to said digital image signal by the sequential device of a photodetecting device and an analog-to-digital converter.

4. The method as claim 3, wherein said photodetecting device is a charge coupled device (CCD).

5. The method as claim 1, wherein said modified digital image signal is further processed by mapping according to a Gamma function.

6. Apparatus for forming an image with sharp contrast, which comprises:

pre-processing means for converting an image in image space to a digital image signal by scanning an object, wherein said object comprises a correction board having a surface with various gray levels, and the set of pixels on said object is object space, whereas the set of pixels on said image is image space, thus the object space is transferred to image space;

digital calibration means for generating the reference level of said digital image signal according to the result of scanning said correction board;

modulation transfer function (MTF) enhancing means for obtaining a backward modifying vector by expressing a pixel in object space in terms of a linear combination of portion of a plurality of corresponding pixels in image space, wherein said backward modifying vector is the coefficients of said linear combination, and generating a modified digital image signal by processing said digital image signal and said backward modifying vector.

7. The apparatus as claim 6, wherein said pre-processing means comprising:
    an image-acquiring device for acquiring an optical image as the source of an image system;
    a photodetecting device for converting an optical image to an electric signal; and
    sampling means for converting said electric signal to said digital image signal.

8. Apparatus as claim 7, wherein said photodetecting device comprises a charge coupled device(CCD).

9. Apparatus as claim 7, wherein said sampling means comprising an analog-to-digital converter.

10. Apparatus as claim 6, wherein said correction board comprising a first gray level and a second gray level, which the first gray level is minimum gray level and the second gray level is the maximum gray level.

11. Apparatus as claim 6, wherein said modulation transfer function enhancing means further comprising mapping the result of multiplying said digital image signal and said backward modifying vector by a Gamma function to obtain said modified digital image signal.

12. A method for forming an image of an image system with sharp contrast, which comprises:
    converting an image in image space to a digital image signal by scanning an object, wherein said object comprises a correction board having a surface with various gray levels on the surface, and the set of pixels on said object is object space, whereas the set of pixels on said image is image space, thus the object space is transferred to image space;
    generating a basic modifying vector by extracting the amplitude and phase angle of the result of scanning said correction board, and generating a transformed digital image signal by extracting the amplitude and phase angle of the result of scanning said object, wherein said basic modifying vector comprising a plurality of amplitude of various frequencies and a compensation angle, said transformed digital image signal comprises amplitude of various frequencies;
    generating a first modified digital signal by processing said basic modifying vector and said transformed digital image signal, wherein said transformed digital image signal is divided by said plurality of amplitude of said basic modifying vector and the phase angle of said transformed digital image signal is subtracted by said compensation angle; and
    generating a second modified digital signal by processing said first modified digital signal, wherein a second transform means multiply said first modified digital signal by a plurality of sine signal of various frequencies.

13. The method as claim 12, wherein said correction board comprising a first gray level and a second gray level, which the first gray level is minimum gray level and the second gray level is the maximum gray level.

14. The method as claim 13, wherein said image is converted to said digital image signal by the sequential device of an optical detecting means and an analog-to-digital converter.

15. The method as claim 12, wherein the amplitude and phase angle is extracted by the transformation of transforming a space domain signal to a frequency domain signal.

16. The method as claim 15, wherein the transformation is a Fourier transformation.

17. The method as claim 12, wherein said second modified digital signal is the transformation of transforming a frequency domain signal to a space domain signal.

18. The method as claim 17, wherein said transformation is an inverse Fourier transformation.

19. The method as claim 12, wherein said second modified digital signal is further processed by mapping according to a Gamma function.

20. Apparatus for forming an image with sharp contrast, which comprises:
    pre-processing means for converting an image in image space to a digital image signal by scanning an object, wherein said object comprises a correction board having a surface with various gray levels on the surface, and the set of pixels on said object is object space, whereas the set of pixels on said image is image space, thus the object space is transferred to image space, said pre-processing means comprising a photodetecting device and an imaging system;
    first transform means for generating a basic modifying vector by extracting the amplitude and phase angle of the result of scanning said correction board, and generating a transformed digital image signal by extracting the amplitude and phase angle of the result of scanning said object, wherein said basic modifying vector comprising a plurality of amplitude of various frequencies and a compensation angle, said transformed digital image signal comprises amplitude of various frequencies;
    modulation transfer function (MTF) enhancing means for generating a first modified digital signal by processing said basic modifying vector and said transformed digital image signal, wherein said transformed digital image signal is divided by said plurality of amplitude of said basic modifying vector and the phase angle of said transformed digital image signal is subtracted by said compensation angle; and
    second transform means for generating a second modified digital signal by processing said first modified digital signal, wherein said second transform means multiply said first modified digital signal by a plurality of sine signal of various frequencies.

21. Apparatus as claim 20, wherein said pre-processing means comprising:
    an image-acquiring device for acquiring an optical image as the source of said imaging system;
    a photodetecting device for converting the optical image to an electric signal; and
    sampling means for converting said electric signal to said digital image signal.

22. Apparatus as claim 21, wherein said photodetecting device comprises a charge coupled device(CCD).

23. Apparatus as claim 21, wherein said sampling means comprising an analog-to-digital converter.

24. Apparatus as claim 20, wherein said correction board comprising a first gray level and a second gray level, which the first gray level is minimum gray level and the second gray level is the maximum gray level.

25. Apparatus as claim 20, wherein said first transform means executes the transformation of transforming a space domain signal to a frequency domain signal.

26. Apparatus as claim 25, wherein said transformation is a Fourier transformation.

27. Apparatus as claim 26, wherein said second transform means executes the transformation of transforming a frequency domain signal to a space domain signal.

28. Apparatus as claim 27, wherein the transformation is an inverse Fourier transformation.

29. Apparatus as claim 20, wherein said modulation transfer function enhancing means further comprising mapping the result of multiplying said digital image signal and a backward modifying vector by a Gamma function to obtain said modified digital image signal.

* * * * *